(12) United States Patent
Kim et al.

(10) Patent No.: US 7,997,328 B2
(45) Date of Patent: Aug. 16, 2011

(54) AIR CONDITIONER

(75) Inventors: Kyung Hwan Kim, Uiwang-si (KR); Keun Hyoung Choi, Seoul (KR); Han Lim Choi, Bucheon-si (KR)

(73) Assignee: LG Electronics Inc., Seoul (KR)

( * ) Notice: Subject to any disclaimer, the term of this patent is extended or adjusted under 35 U.S.C. 154(b) by 1017 days.

(21) Appl. No.: 11/848,358

(22) Filed: Aug. 31, 2007

(65) Prior Publication Data

US 2008/0156454 A1    Jul. 3, 2008

(30) Foreign Application Priority Data

Dec. 29, 2006   (KR) .................. 10-2006-0139064

(51) Int. Cl.
*F24H 3/10* (2006.01)
(52) U.S. Cl. .......................................... 165/122; 165/66
(58) Field of Classification Search .................... 165/54, 165/59, 66, 122; 454/241; 62/426
See application file for complete search history.

(56) References Cited

FOREIGN PATENT DOCUMENTS

| CN | 2134168 | * | 5/1995 |
| JP | 09-318130 A | | 12/1997 |
| JP | 11-118222 A | | 4/1999 |

OTHER PUBLICATIONS

Chinese Office Action dated Nov. 15, 2010 for Application No. 200710153489.6, with English translation, 10 pages.

* cited by examiner

*Primary Examiner* — Teresa J Walberg
(74) *Attorney, Agent, or Firm* — Fish & Richardson P.C.

(57) ABSTRACT

In an air conditioner, air-supply passages cross air-discharge passages, and heat exchangers are disposed at intersections between the air-supply passages and the air-discharge passages. This increases the effective heat-exchanging areas of the heat exchangers. In addition, the air conditioner is configured such that the air conditioner can be easily installed and repaired even when the air conditioner is rotated to be properly connected with air-supply ducts and air-discharge ducts.

9 Claims, 7 Drawing Sheets

[Fig 1]
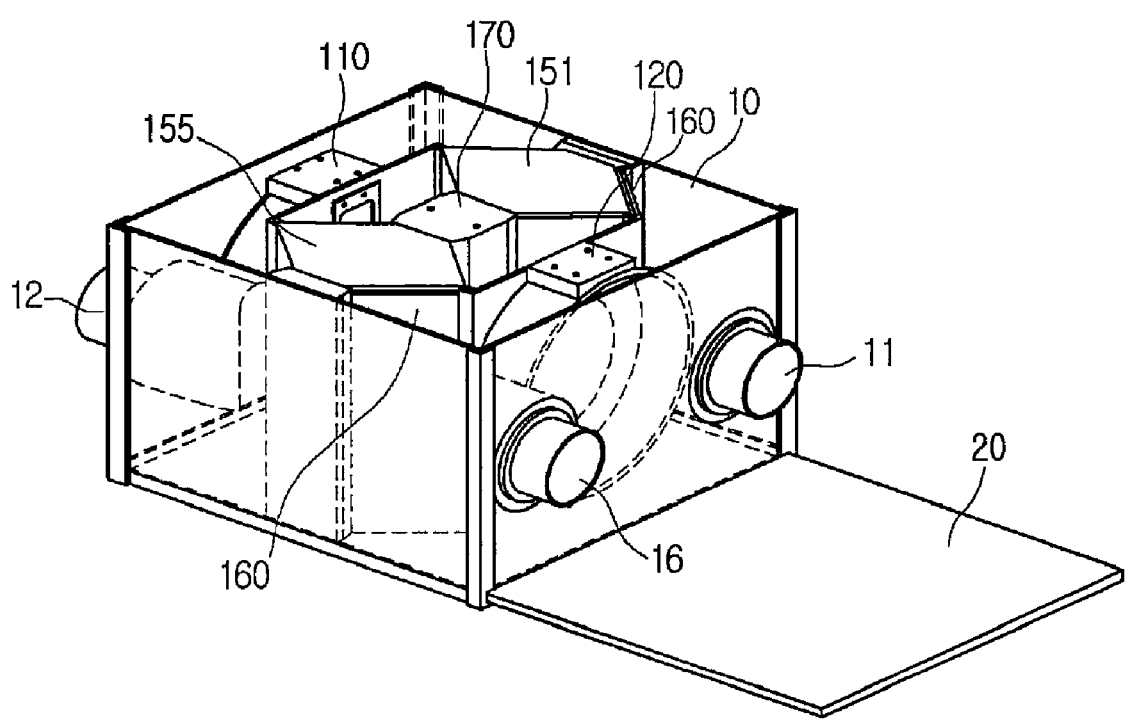

[Fig 2]
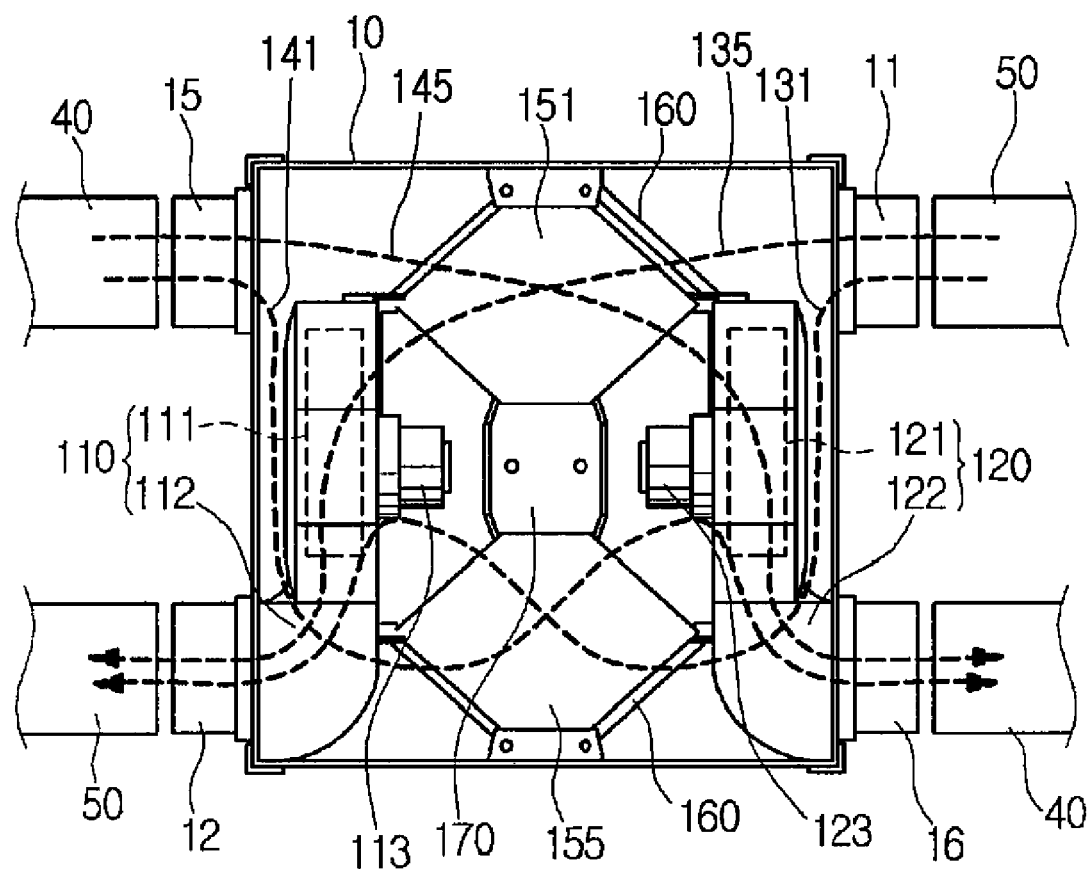

[Fig 3]
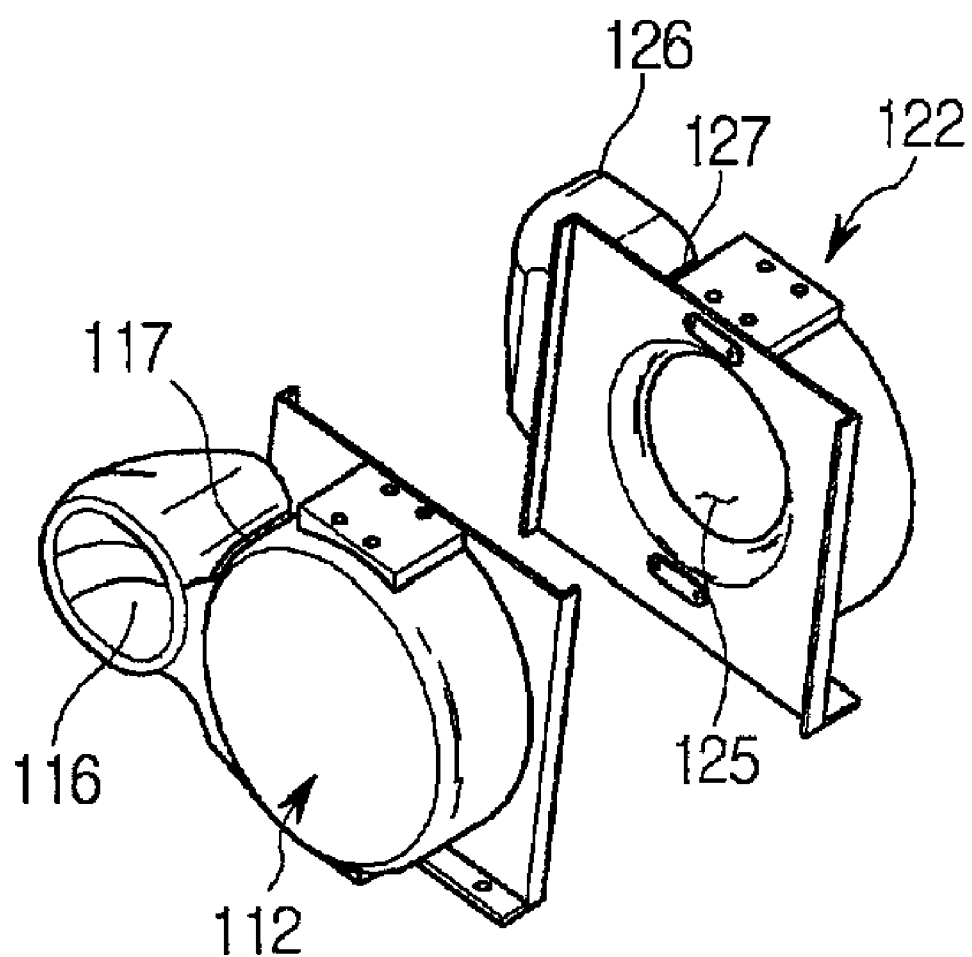

[Fig 4]
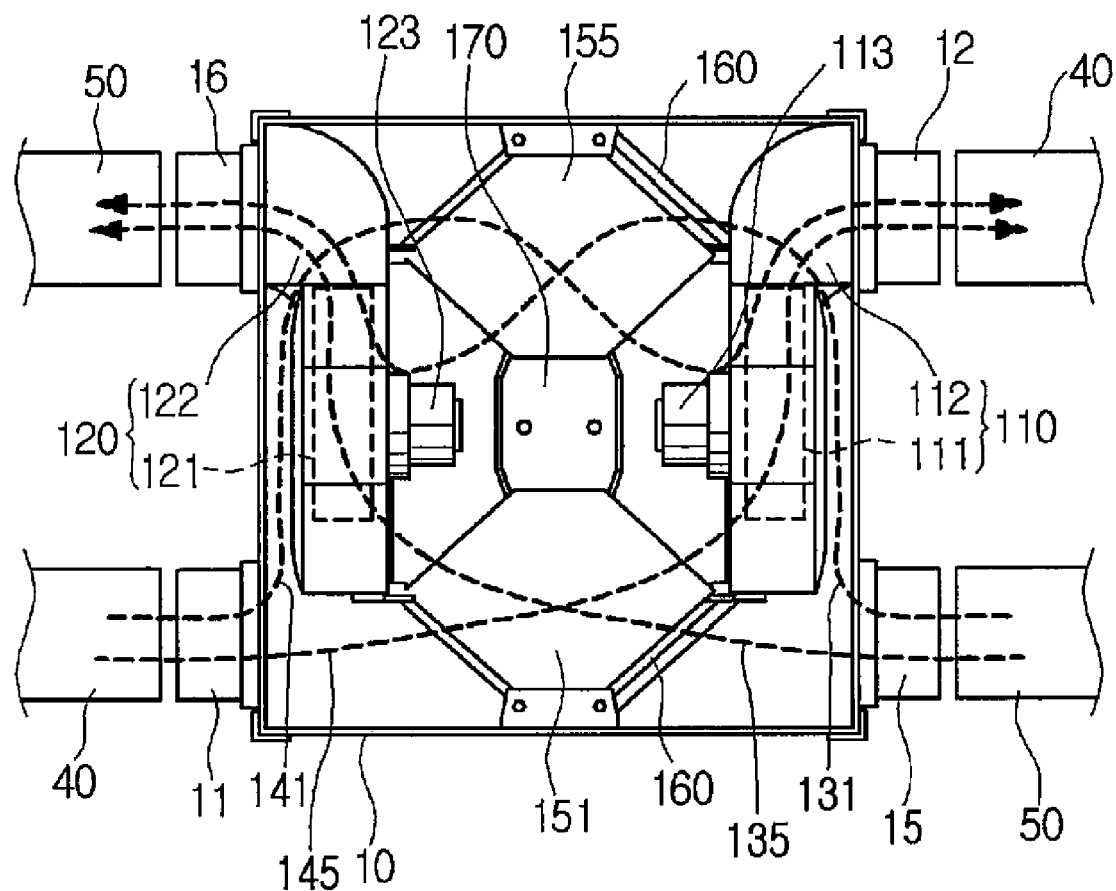

[Fig 5]
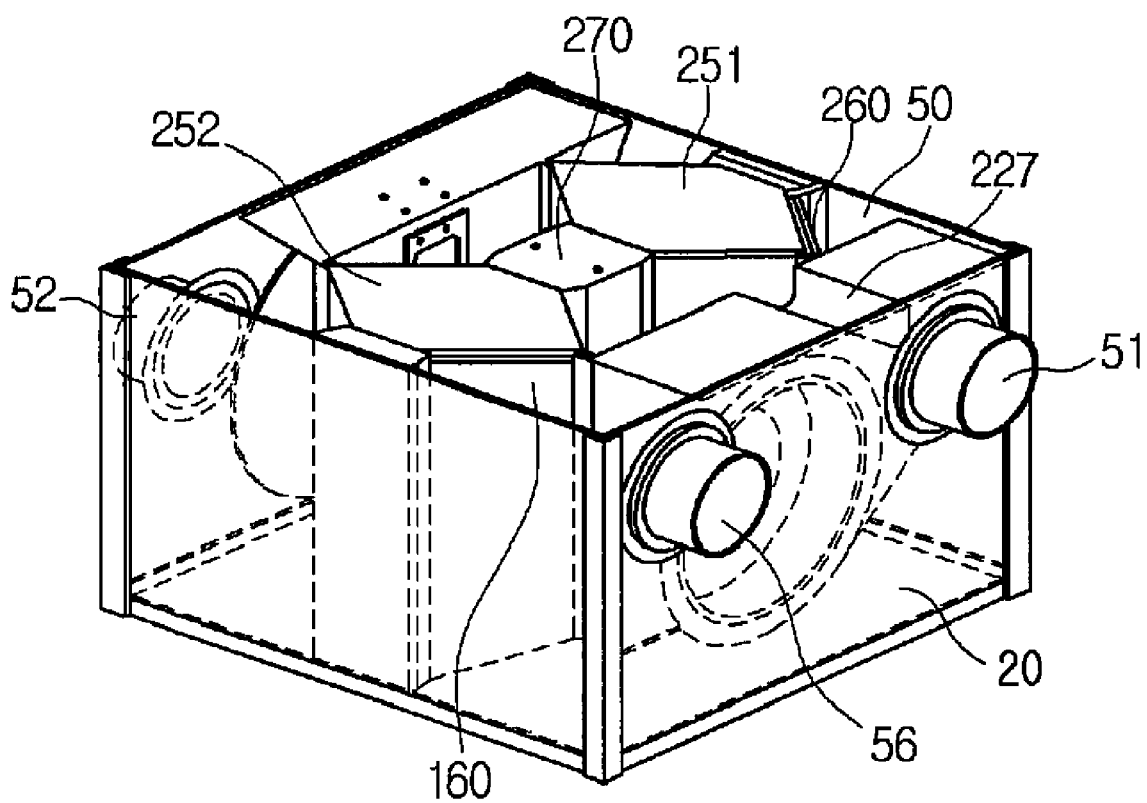

[Fig 6]
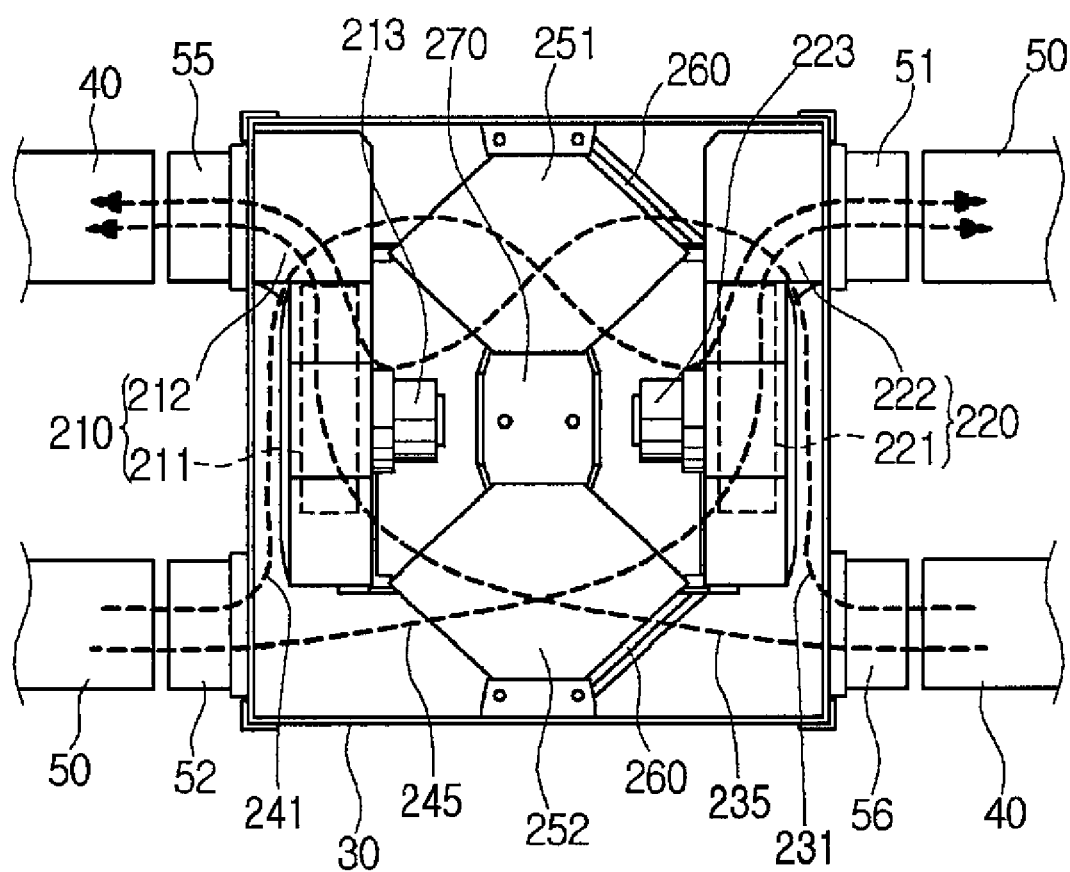

[Fig 7]
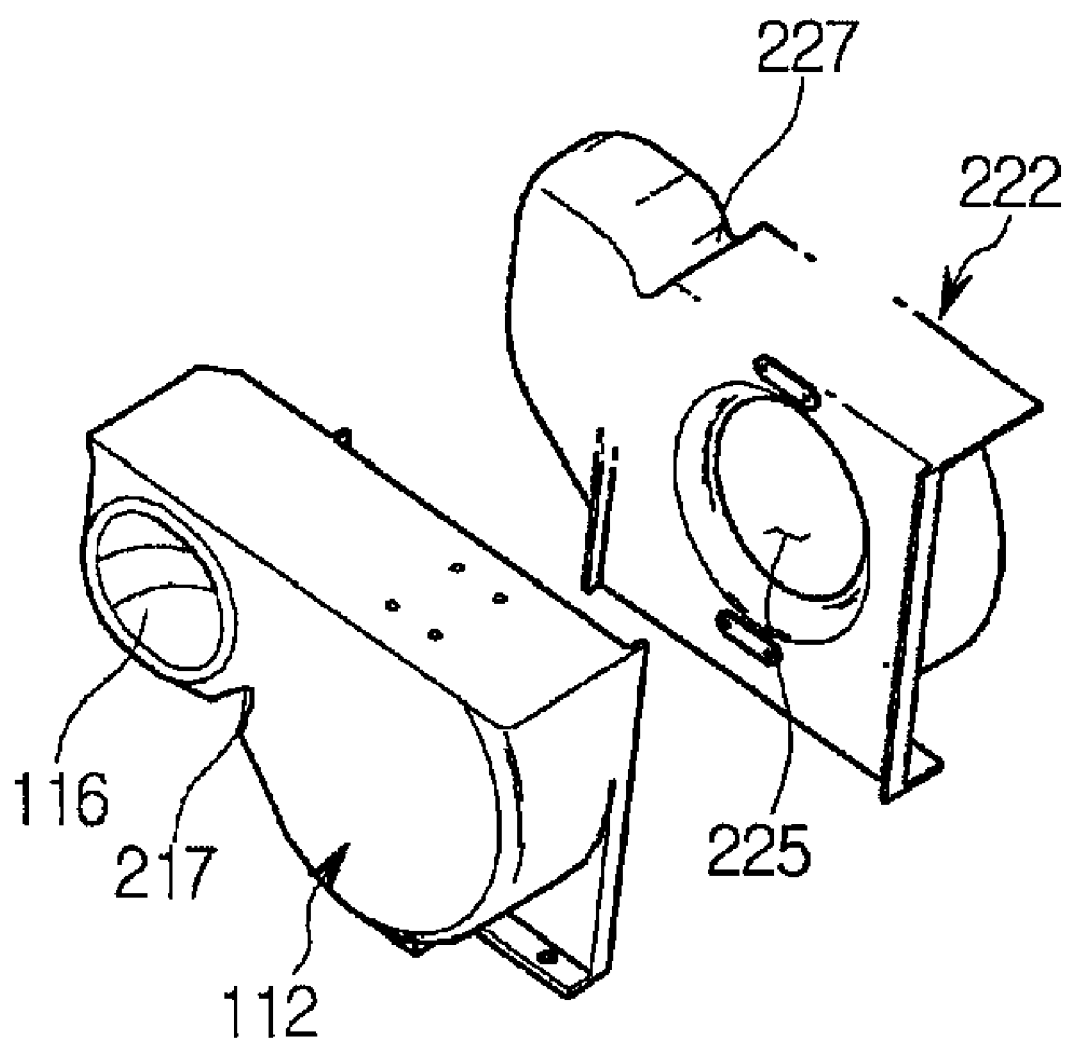

AIR CONDITIONER

CROSS-REFERENCE TO RELATED APPLICATIONS

This application claims the benefit of Korean Patent Application No. 10-2006-0139064, filed on Dec. 29, 2006, which is incorporated by reference in its entirety.

BACKGROUND

The present disclosure relates to an air conditioner.

Examples of air conditioners include a ventilating system and a heating/cooling system. A ventilating system is connected to an air-supply duct and an air-discharge duct that are attached to the ceiling of a building.

In the ventilating system, an air-supply passage and an air-discharge passage are formed. Outdoor air is supplied to an indoor area through the air-supply passage, and indoor air is discharged to an outdoor area through the air-discharge passage. The air-supply passage and the air-discharge passage cross each other, and a heat exchanger is disposed at the intersection between the air-supply passage and the air-discharge passage. The indoor air and the outdoor air exchange heat with each other at the heat exchanger. Therefore, some of the thermal energy of the indoor air can be recovered before the indoor air is discharged to the outdoor area.

SUMMARY

In one general aspect, an air conditioner includes a case, an air-discharge inlet, an air-discharge outlet, an air-supply inlet, an air-supply outlet, an air-supply unit, an air-discharge unit, and first and second heat exchangers. The case has a first side, a second side, a third side opposite the first side, and a fourth side opposite the second side. The case further includes a top surface and a bottom surface. The air-discharge inlet is installed at the first side and located closer to the second side than to the fourth side. The air-discharge outlet is installed at the third side and located closer to the fourth side than to the second side. The air-supply inlet is installed at the third side and located closer to the second side than to the fourth side. The air-supply outlet is installed at the first side and located closer to the fourth side than to the second side.

The air-supply unit is installed in the case and configured to flow air from the air-supply inlet to the air-supply outlet. The air-discharge unit is installed in the case and configured to flow air from the air-discharge inlet to the air-discharge outlet. The air-supply unit, the air-discharge unit and the two heat exchangers are arranged in such a manner that first and second air-supply passages are formed from the air-supply inlet to the air-supply outlet and first and second air-discharge passages are formed between the air-discharge inlet to the air-discharge outlet. The first air-supply passage crosses the first air-discharge passage in the first heat exchanger and the second air-supply passage crosses the second air-discharge passage in the second heat exchanger.

In another general aspect, an air conditioner includes a case including at least two air-supply passages and at least two air-discharge passages. One of the air supply passages crosses one of the air discharge passages and the other air supply passage crosses the other air discharge passage. The air conditioner further includes an air-supply unit disposed in the case and connected to the air-supply passages, an air-discharge unit disposed in the case opposite to the air-supply unit and connected to the air-discharge passages, and at least two heat exchangers disposed in the case.

Implementations may include one or more of the following features. For example, the first air-discharge passage may be formed between the first side of the case and the air-supply unit. The first air-supply passage may be formed between the third side of the case and the air-discharge unit. The air-supply unit and the air-discharge unit may face each other. Each of the air-supply unit and the air-discharge unit may include a scroll portion and/or air-discharge portion.

Each of the heat exchangers may include a detachable filter. In each of the heat exchangers, one air-supply passage and one air-discharge passage may cross each other. The air conditioner may further include an openable service panel at the bottom surface of the case. Each of the air-discharge inlet, the air-discharge outlet, the air-supply inlet and the air-supply outlet may be positioned closer to the top surface than to the bottom surface.

These and other implementations may provide an air conditioner designed to increase an effective heat-exchanging area of a heat exchanger, an air conditioner that can be easily installed, and an air conditioner that can be easily repaired even when the air conditioner has been rotated for installation.

Since the heat exchangers are disposed at the intersections between the air-supply passages and the air-discharge passages, air can be uniformly directed to the heat exchangers. Therefore, the heat exchanger can be efficiently used, and the effective heat-exchanging areas of the heat exchangers can be increased.

Furthermore, the air-supply passages and the air-discharge passages are formed in the same shapes so that indoor air and outdoor air can flow into the heat exchangers approximately at the same flow rate. Therefore, heat can be efficiently exchanged between indoor air and outdoor air.

In addition, even when an air-supply duct and an air-discharge duct are arranged on the ceiling of a building in a way different from that expected, the air conditioner can be installed to the ceiling by horizontally rotating the air conditioner by 180°. Therefore, the air conditioner is less limited to the conditions of installation places.

Moreover, the position of the service panel can be kept at the bottom surface of the case even when the air conditioner is rotated by 180° on a horizontal plane. Therefore, the air conditioner can be easily installed to a desired place. Furthermore, any component of the air conditioner can be easily replaced with a new one even when the air conditioner is rotated for installation.

The details of one or more implementations are set forth in the accompanying drawings and the description below. Other features will be apparent from the description and drawings, and from the claims.

BRIEF DESCRIPTION OF THE DRAWINGS

FIG. 1 is a perspective view illustrating an air conditioner in one implementation.

FIG. 2 is a plan view illustrating the air conditioner of FIG. 1.

FIG. 3 is a perspective view illustrating a pair of scroll housings disposed in the air conditioner of FIG. 1.

FIG. 4 is a plan view illustrating airflows in the air conditioner of FIG. 1 when the air conditioner is rotated by 180° from the position shown in FIG. 2.

FIG. 5 is a perspective view illustrating an air conditioner in another implementation.

FIG. 6 is a plan view illustrating the air conditioner of FIG. 5.

FIG. 7 is a perspective view illustrating a pair of scroll housings disposed in the air conditioner of FIG. 5.

DETAILED DESCRIPTION

FIG. 1 is a perspective view illustrating an air conditioner in one implementation, and FIG. 2 is a plan view illustrating the air conditioner of FIG. 1.

Referring to FIGS. 1 and 2, the air conditioner includes a case 10. In the case 10, an air-supply unit 110, an air-discharge unit 120, and heat exchangers such as a first heat exchanger 151 and a second heat exchanger 155 are disposed. The air-supply unit 110 is disposed at one side of the case 10, and the air-discharge unit 120 is disposed at the other side of the case 10. The first and second heat exchangers 151 and 155 are disposed between the air-supply unit 110 and the air-discharge unit 120.

The air-supply unit 110, the air-discharge unit 120, and the first and second heat exchangers 151 and 155 may be fixed to side and top surfaces of the case 10. An air-supply scroll housing 112 and an air-discharge scroll housing 122 may include a plurality of coupling holes (not shown) for receiving coupling members (not shown). Furthermore, coupling holes can be formed in top surfaces of the first and second heat exchangers 151 and 155. A supporting structure can be disposed in the case 10 for supporting the air-supply unit 110, the air-discharge unit 120, and the first and second heat exchangers 151 and 155 with respect to the side and top surfaces of the case 10. Various coupling mechanisms can be used for the air-supply unit 110, the air-discharge unit 120, and the first and second heat exchangers 151 and 155.

An openable service panel 20 can be attached to a bottom surface of the case 10. The service panel 20 can be attached to the bottom surface of the case 10 using, for example, a hinge structure. Alternatively, the service panel 20 can be attached to the bottom surface of the case 10 using a sliding mechanism. In FIG. 1, the bottom surface of the case 10 may be opened by sliding out the service panel 20.

The air-supply unit 110 includes a centrifugal fan 111 and the air-supply scroll housing 112, and the air-discharge unit 120 includes a centrifugal fan 121 and the air-discharge scroll housing 122. Each of the centrifugal fans 111 and 121 sucks air in its axial direction and discharges the air in its radial direction. A turbofan or a sirocco fan can be used for the centrifugal fans 111 and 121. The centrifugal fans 111 and 121 are coupled to motors 113 and 123, respectively.

In the case 10, multiple air-supply passages cross multiple air-discharge passages. The first and second heat exchangers 151 and 155 are disposed at intersections between the air-supply passages and the air-discharge passages as follows.

In the case 10, the air-supply passages are connected to the air-supply unit 110. For example, the air-supply passages include a first air-supply passage 131 that passes between a side surface of the case 10 and the air-discharge unit 120. Here, the side surface of the case 10 and the discharge unit 120 are spaced apart from each other by a predetermined distance. The air-supply passages may further include a second air-supply passage 135 formed along a diagonal line of the case 10. That is, the first and second air-supply passages 131 and 135 are separated from each other by the air-discharge unit 120.

In the case 10, the air-discharge passages are connected to the air-discharge unit 120. For example, the air-discharge passages include a first air-discharge passage 141 that passes between a side surface of the case 10 and the air-supply unit 110. Here, the side surface of the case 10 and the air-supply unit 110 are spaced apart from each other by a predetermined distance. The air-discharge passages may further include a second air-discharge passage 145 formed along a diagonal line of the case 10. That is, the first and second air-supply passages 141 and 145 are separated from each other by the air-supply unit 110.

An air-supply inlet 11 is formed in one side of the case 10 and connected to the first and second air-supply passages 131 and 135, and an air-supply outlet 12 is formed in the other side of the case 10 in a diagonal direction to the air-supply inlet 11. Air-supply ducts 50 are connected to the air-supply inlet 11 and air-supply outlet 12.

An air-discharge inlet 15 is formed in one side of the case 10 and connected to the first and second air-discharge passages 141 and 145, and an air-discharge outlet 16 is formed in the other side of the case 10 in a diagonal direction to the air-discharge inlet 15. Air-discharge ducts 40 are connected to the air-discharge inlet 15 and air-discharge outlet 16, respectively.

The air-supply outlet 12 and the air-discharge inlet 15 are connected to an indoor area, and the air-supply inlet 11 and the air-discharge outlet 16 are connected to an outdoor area.

In FIG. 1, the air-supply inlet 11, the air-supply outlet 12, the air-discharge inlet 15, and the air-discharge outlet 16 are formed at the sides of the case 10 and at the middle of the bottom and top of the case 10. Alternatively, the air-supply inlet 11, the air-supply outlet 12, the air-discharge inlet 15, and the air-discharge outlet 16 can be formed near the top of the case 10.

The first and second air-discharge passages 141 and 145 cross the first and second air-supply passages 131 and 135, respectively. For example, the first air-discharge passage 141 crosses the first air-supply passage 131, and the second air-discharge passage 145 crosses the second air-supply passage 135. Different arrangements of air passages may be possible.

The first and second heat exchangers 151 and 155 are disposed at intersections between the first and second air-supply passages 131 and 135 and the first and second air-discharge passages 141 and 145. For example, the second heat exchanger 155 can be disposed at the intersection between the first air-supply passage 131 and the first air-discharge passage 141, and the first heat exchanger 151 can be disposed at the intersection between the second air-supply passage 135 and the second air-discharge passage 145. Here, the first and second heat exchangers 151 and 155 are disposed in parallel with each other.

A barrier member 170 is disposed between the first and second heat exchangers 151 and 155. The barrier member 170 separates the first and second air-supply passages 131 and 135 and the first and second air-discharge passages 141 and 145.

Each of the first and second heat exchangers 151 and 155 includes passages (not shown) through which indoor air and outdoor air can pass separately. For example, each of the first and second heat exchangers 151 and 155 can be formed by stacking a plurality of plate-shaped heat exchanging elements (not shown) each including a passage. In this case, a passage for indoor air and a passage for outdoor air may be repeated in turns. The first and second heat exchangers 151 and 155 can have other structures.

Filters 160 are detachably disposed at the first and second heat exchangers 151 and 155, respectively. The filters 160 can be used only for outdoor air. In detail, when inflow passages of outdoor air are changed, the filters 160 can be repositioned in the first and second heat exchangers 151 and 155 to clean the outdoor air before the outdoor air is introduced into the indoor area through the first and second heat exchangers 151 and 155.

The use of two heat exchangers improves the efficiency of heat exchange. When only one heat exchanger is disposed at the intersection between the air-supply passage and the air-discharge passage, indoor and outdoor air streams partially pass through a certain part of the heat exchanger. In other words, a suction force of a fan is partially applied to a certain part of the heat exchanger. Furthermore, the air resistance of the heat exchanger varies according to the shapes of the air-supply passage and the air-discharge passage. Therefore, the effective heat-exchanging area of the heat exchanger decreases, and thus the performance of the heat exchanger decreases.

FIG. 3 is a perspective view illustrating the air-supply scroll housing 112 and the air-discharge scroll housing 122.

Referring to FIG. 3, the air-supply scroll housing 112 includes a suction intake (not shown), and the air-discharge scroll housing 122 includes a suction intake 125. The suction intakes face each other when installed.

The air-supply scroll housing 112 and the air-discharge scroll housing 122 further include air-discharge portions 116 and 126, respectively. The air-discharge portion 116 of the air-supply scroll housing 112 can be connected to the air-supply outlet 12, and the air-discharge portion 126 of the air-discharge scroll housing 122 can be connected to the air-discharge outlet 16.

The air-supply scroll housing 112 and the air-discharge scroll housing 122 further include scroll portion 117 and 127, respectively. Air sucked by the centrifugal fans 111 and 121 is guided in a radial direction of the air-supply scroll housing 112 and the air-discharge scroll housing 122 by the scroll portions 117 and 127. The scroll portions 117 and 127 are formed at upper portions of the air-supply scroll housing 112 and the air-discharge scroll housing 122.

The air-supply scroll housing 112 and the air-discharge scroll housing 122 may be formed by injection molding using different molds.

It will now be described how the air conditioner of FIG. 1 is installed in different duct arrangements.

FIG. 4 is a plan view illustrating airflows in the air conditioner of FIG. 1 when the air conditioner is rotated by 180° from the position shown in FIG. 2, to accommodate different duct arrangements.

Referring again to FIG. 2, the air-supply outlet 12 and the air-discharge inlet 15 are connected to the indoor area, and the air-supply inlet 11 and the air-discharge outlet 16 are connected to the outdoor area. However, the air-supply ducts 50 and the air-discharge ducts 40 can be arranged on the ceiling of a building in different manners. For example, the air-supply ducts 50 and the air-discharge ducts 40 can be arranged as shown in FIG. 4 different from the case shown in FIG. 2.

Referring to FIG. 4, the positions of the air-supply ducts 50 and the air-discharge ducts 40 are reversed as compared with those of the air-supply ducts 50 and air-discharge ducts 40 shown in FIG. 2. In this case, the air conditioner can be coupled with the air-supply ducts 50 and the air-discharge ducts 40 after rotating the case 10 horizontally by 180° from the position shown in FIG. 2 to the position shown in FIG. 4. The air-supply inlet and outlet 11 and 12 are coupled to the air-discharge ducts 40, working as air-discharge inlet and outlet, and the air-discharge inlet and outlet 15 and 16 are coupled to the air-supply ducts 50, working as air-supply inlet and outlet. Therefore, in FIG. 4, the first and second air-supply passages 131 and 135 are formed between air-discharge inlet 15 and outlet 16, and the first and second air-discharge passages 141 and 145 are formed between air-supply inlet 11 and outlet 12.

In the installations of FIGS. 2 and 4, the service panel 20 remains at the bottom of the case 10. Therefore, the service panel 20 can be freely opened and closed when the air conditioner is installed. Furthermore, after installing the air conditioner, any component of the air conditioner can be easily replaced with a new one by opening the service panel 20.

Moreover, after opening the service panel 20, the filters 160 can be repositioned in the first and second heat exchangers 151 and 155 in order to clean outdoor air sucked along the first and second air-discharge passages 141 and 145 that are now used as air-supply passages.

As described above, the arrangement of the air-conditioner in FIG. 1 allows the installation of the air-conditioner in different duct arrangements by horizontally rotating the air-conditioner. Therefore, the service panel 20 remains at the bottom of the case 10, facilitating maintenance. If an air-conditioner should be installed upside-down in order to accommodate a different arrangement, the service panel will be placed at the top portion, thereby increasing the difficulty of maintenance.

Moreover, the inlets and outlets of an air-conditioner may be positioned near the top of a case, so as to be easily connected to the ducts. Installing such an air-conditioner upside-down would be difficult because the vertical positions of the inlets and outlets will be changed, whereas horizontally rotating the air-condition for installation will not change the positions of the inlets and outlets.

It will now be described how the air conditioner of FIG. 1 operates.

Referring to FIG. 2, when the motors 113 and 123 operate, the centrifugal fans 111 and 121 of the air-supply unit 110 and the air-discharge unit 120 are rotated.

Then, outdoor air is supplied through the air-supply ducts 50, and indoor air is discharged through the air-discharge ducts 40.

Here, some of the outdoor air is directed to the second heat exchanger 155 along the first air-supply passage 131 formed between the case 10 and the air-discharge unit 120. The remaining outdoor air is directed to the first heat exchanger 151 along the second air-supply passage 135 formed in a diagonal direction of the case 10.

At the same time, some of the indoor air is directed to the second heat exchanger 155 along the first air-discharge passage 141 formed between the case 10 and the air-supply unit 110. The remaining indoor air is directed to the first heat exchanger 151 along the second air-discharge passage 145 formed in a diagonal direction of the case 10.

The first and second heat exchangers 151 and 155 are parallel with each other and are disposed at the intersections of the first and second air-supply passages 131 and 135 and the first and second air-discharge passages 141 and 145. Therefore, the outdoor air can pass through each of the first and second heat exchangers 151 and 155 at the same rate as the indoor air, and thus the first and second heat exchangers 151 and 155 can have high efficiency.

Furthermore, since the first air-supply passage 131 is approximately the same shape as the first air-discharge passage 141, pressure distribution in the first air-supply passage 131 is approximately the same as that in the first air-discharge passage 141. For the same reason, pressure distribution in the second air-supply passage 135 is approximately the same as that in the second air-discharge passage 145. In other words, sucking forces of the air-supply unit 110 and the air-discharge unit 120 are uniformly applied to the first and second heat exchangers 151 and 155. Therefore, effective heat-exchanging areas of the first and second heat exchangers 151 and 155 can be increased. Thus, the efficiencies of the first and second heat exchangers 151 and 155 can be increased.

After exchanging heat with indoor air at the first heat exchanger 151, the outdoor air is introduced into the indoor area through the second air-supply passage 135. Meanwhile, the indoor air is discharged from the first heat exchanger 151 to the outdoor area through the second air-discharge passage 145.

FIG. 5 is a perspective view illustrating an air conditioner in another implementation, FIG. 6 is a plan view illustrating the air conditioner of FIG. 5, and FIG. 7 is a perspective view illustrating a pair of scroll housings disposed in the air conditioner of FIG. 5.

Referring to FIGS. 5 and 6, the air conditioner includes a case 30. The case 30 includes an air-supply outlet 51 and an air-supply inlet 52 that are connected with a plurality of air-supply passages such as a first air-supply passage 241 and a second air-supply passage 245. The case 30 further includes an air-discharge outlet 55 and an air-discharge inlet 56 that are connected to a plurality of air-discharge passages such as a first air-discharge passage 231 and a second air-discharge passage 235.

The air-supply outlet 51, the air-supply inlet 52, the air-discharge outlet 55, and the air-discharge inlet 56 are formed in the side surfaces of the case 30 close to the top, as shown in FIG. 5. Therefore, the air conditioner can be easily installed on the ceiling of a building.

Referring to FIGS. 6 and 7, an air-supply unit 220 includes an air-supply scroll housing 222 and a centrifugal fan 221, and an air-discharge unit 210 includes an air-discharge scroll housing 212 and a centrifugal fan 211.

The air-supply scroll housing 222 and the air-discharge scroll housing 212 are formed by injection molding using the same mold. A scroll portion 227 of the air-supply scroll housing 222 faces downward, and a scroll portion 217 of the air-discharge scroll housing 212 faces upward.

Like the air-conditioner illustrated in FIG. 1, when the arrangement of air-supply ducts 50 and discharge ducts 40 is reversed from the arrangement in FIG. 6, the air-conditioner in FIG. 6 may be horizontally rotated by 180°, when installed, to accommodate such a duct arrangement.

Although the case 30 is rotated by 180°, the inlets and outlets 51, 52, 55, and 56 are still located near the top of the case 30. For this reason, the air conditioner can still be easily installed to the ceiling of a building.

Furthermore, although the case 30 is rotated, a service panel can still be located on the bottom of the case 30. Since the position of the service panel can be kept at the bottom of the case 30, after the air conditioner is installed, any component of the air conditioner can be easily replaced with a new one by opening the service panel 60.

When the air-conditioner in FIG. 6 is horizontally rotated by 180°, the air-supply inlet and outlet 52 and 51 are coupled to the air-discharge ducts 40, and the air-discharge outlet and inlet 55 and 56 are coupled to the air-supply ducts 50. In this case, the first and second air-supply passages 241 and 245 are used as air-discharge passages for discharging indoor air to an outdoor area, and the first and second air-discharge passages 231 and 235 are used as air-supply passages for introducing outdoor air into an indoor area.

After opening the service panel 60, filters 260 of the first and second heat exchangers 251 and 255 are repositioned in order to clean outdoor air introduced into indoors. Other implementations are within the scope of the following claims.

What is claimed is:

1. An air conditioner comprising:
   a case having a first side, a second side, a third side opposite the first side, and a fourth side opposite the second side, the case further including a top surface and a bottom surface;
   an air-discharge inlet installed at the first side, the air-discharge inlet located closer to the second side than to the fourth side;
   an air-discharge outlet installed at the third side, the air-discharge outlet located closer to the fourth side than to the second side;
   an air-supply inlet installed at the third side, the air-supply inlet located closer to the second side than to the fourth side;
   an air-supply outlet installed at the first side, the air-supply outlet located closer to the fourth side than to the second side;
   an air-supply unit installed in the case and configured to flow air from the air-supply inlet to the air-supply outlet;
   an air-discharge unit installed in the case and configured to flow air from the air-discharge inlet to the air-discharge outlet;
   a centrifugal fan provided at the air-supply unit and the air-discharge unit, respectively, and configured to suck air in an axial direction thereof and discharge the air in a radial direction thereof;
   an air-supply scroll housing including a first suction intake and a first air-discharge portion configured to be connected to the air supply outlet;
   an air-discharge scroll housing including a second suction intake configured to face the first suction intake and a second air-discharge portion configured to be connected to the air discharge outlet; and
   first and second heat exchangers installed in the case,
   wherein the air-supply unit, the air-discharge unit and the two heat exchangers are arranged in such a manner that first and second air-supply passages are formed from the air-supply inlet to the air-supply outlet and first and second air-discharge passages are formed between the air-discharge inlet to the air-discharge outlet, the first air-supply passage crossing the first air-discharge passage in the first heat exchanger and the second air-supply passage crossing the second air-discharge passage in the second heat exchanger.

2. The air conditioner according to claim 1, wherein the first air-discharge passage is formed between the first side of the case and the air-supply unit.

3. The air conditioner according to claim 1, wherein the first air-supply passage is formed between the third side of the case and the air-discharge unit.

4. The air conditioner according to claim 1, wherein each of the heat exchangers comprises a detachable filter.

5. The air conditioner according to claim 1, further comprising an openable service panel at the bottom surface of the case.

6. The air conditioner according to claim 5, wherein the service panel is configured to maintain its location on the bottom of the case after the case has been rotated.

7. The air conditioner according to claim 1, wherein the air-supply unit and the air-discharge unit face each other.

8. The air conditioner according to claim 1, wherein each of the air-supply scroll housing and the air-discharge scroll housing comprises a scroll portion that guides air in a radial direction of the air-supply scroll housing and the air-discharge scroll housing.

9. The air conditioner according to claim 1, wherein each of the air-discharge inlet, the air-discharge outlet, the air-supply inlet and the air-supply outlet is positioned closer to the top surface than to the bottom surface.

* * * * *